Dec. 5, 1933.  A. O. AUSTIN  1,937,620
INSULATOR
Filed June 18, 1931   5 Sheets-Sheet 1

INVENTOR
ARTHUR O. AUSTIN
BY Alpheus J. Crane
ATTORNEY

Dec. 5, 1933.  A. O. AUSTIN  1,937,620
INSULATOR
Filed June 18, 1931   5 Sheets-Sheet 2

INVENTOR
ARTHUR O. AUSTIN
BY Alpheus J. Crane
ATTORNEY

Dec. 5, 1933.  A. O. AUSTIN  1,937,620
INSULATOR
Filed June 18, 1931   5 Sheets-Sheet 3

INVENTOR
ARTHUR O. AUSTIN
BY Alpheus J. Crane
ATTORNEY

Dec. 5, 1933.     A. O. AUSTIN     1,937,620
INSULATOR
Filed June 18, 1931     5 Sheets-Sheet 4

INVENTOR
ARTHUR O. AUSTIN
BY Alpheus J. Crane
ATTORNEY

Patented Dec. 5, 1933

1,937,620

UNITED STATES PATENT OFFICE 1,937,620

INSULATOR

Arthur O. Austin, near Barberton, Ohio, assignor, by mesne assignments, to The Ohio Brass Company, Mansfield, Ohio, a corporation of New Jersey Application June 18, 1931. Serial No. 545,222

24 Claims. (Cl. 173—318)

This invention relates to insulators and particularly to insulators designed for high mechanical loads, and has for one of its objects the provision of an insulator which will automatically compensate for changes in load and for differential expansion and contraction of its parts, due to changes in temperature.

A further object is to provide an insulator wherein the compensation will be effected with certainty and reliability.

A further object is to provide an insulator which will withstand high mechanical loads without danger of failure due to temperature changes.

A further object is to provide an insulator which shall be of improved construction and operation.

Other objects and advantages will appear from the following description.

The invention is exemplified by the combination and arrangement of parts shown in the accompanying drawings and described in the following specification, and it is more particularly pointed out in the appended claims.

In high voltage insulators, transmission of the stresses between the metal and dielectric parts is a serious problem, particularly where the parts are large or the stresses are high. In general the dielectric members, which may be made of porcelain, glass or other material, are fragile in nature, having a high mechanical strength in compression but are rather weak in tension and shear. The metal parts are usually made of steel, iron or a non-ferrous alloy. The mechanical strength of the metal is considerably greater than that of the dielectric and the linear coefficient of expansion for changes in temperature is generally from two to three times that of the dielectric. The modulus of elasticity of the metal parts is usually from six to ten times that of the dielectric.

The load carried by an insulator tends to distort not only the dielectric but also the metal parts in accordance with well-known laws. Thermal stresses or stresses set up due to differential expansion or contraction also tend to set up stress with resulting strain in the dielectric. Where the stress or strain becomes too great in the dielectric, failure will result. Although the parts may not pull apart mechanically, a crack in the dielectric will result in electrical failure of the piece rendering it useless. In the production of an insulator it is essential that the stress set up by the combined working load and differential expansion or contraction in the attached metal parts shall not cause a rupture of the dielectric. It is therefore advisable that the stress set up in the dielectric be restricted as far as possible to that produced by the working load, the thermal stress being kept as small as possible.

Where the metal parts are made large in order to reduce the resulting strain in the dielectric member, the increased sections of the metal will tend to increase the so-called thermal stress, particularly when the temperature is low.

In the improved construction distortion of the parts is compensated for and a large part of the thermal stress is reduced or eliminated. By compensating for the distortion or strain of the parts, it is possible to increase the working loads without rupturing the dielectric, and it is also possible to use lighter parts which will normally have larger distortions. The use of the lighter parts tends to reduce the thermal stress even though there is no compensation for this stress.

In my prior Patent No. 1,490,030 a resilient type of insert for cementing into dielectric members is shown. This insert has the ability to limit to a very large extent the stress due to the load, or set up by differential expansion or contraction. In the present improvement this feature is retained but in addition the working load applied to the parts causes reactions such that distortion is compensated for. It is this compensating feature for the heavy working loads and also for thermal stresses which is particularly valuable.

There are a number of different ways of embodying the principles of the invention. In the form of the invention shown in Fig. 1 the dielectric member 10 has a flange and closed head of the usual type. This is provided with gripping surfaces 11 and 12, to which cement will adhere. The insulator is provided with a cap 13 having a socket 14 for attaching to adjacent insulators or a supporting structure. A corresponding pin with ball end 15 is used for applying the load to the other end of the insulator. The cap has a cylindrical or conical portion 16 to which a compensating band 17, described and claimed in my prior Patent No. 1,737,749, is attached, although the latter may not be necessary in many cases.

Figures 1, 2, 3, 4, 5:
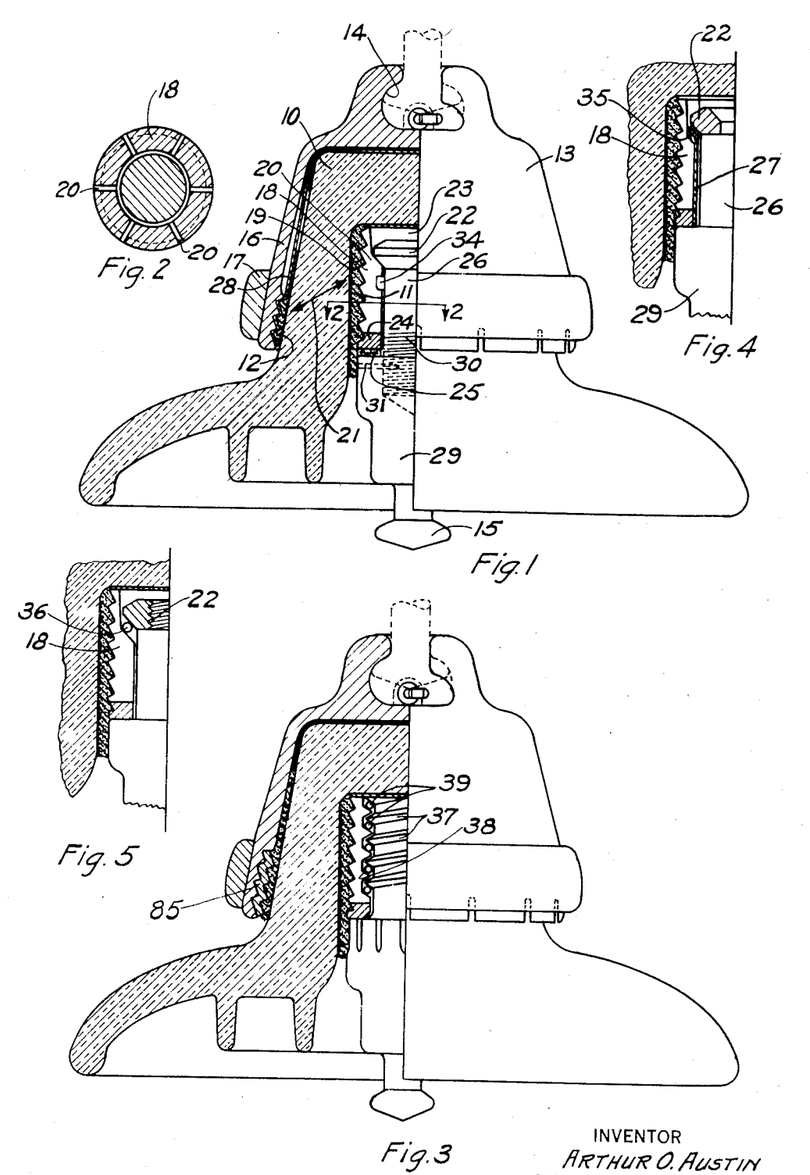
Fig. 1 is an elevation with parts in section showing an insulator having one form of the present invention applied thereto.
Fig. 2 is a fragmentary section of an insulator pin on line 2—2 of Fig. 1.
Fig. 3 is a view similar to Fig. 1 showing a modified form of the invention.
Figs. 4 and 5 are fragmentary, sectional views showing other modifications.

Since the area to which the stress is applied is much smaller on the inner surface than the outer surface of the dielectric 10, it is very important that the proper distribution of stress or the mechanical relations between the inner metal part and the dielectric be carefully controlled.

Since the distortion of the dielectric is approximately ten times that of the metal part for the same unit stress, and the metal parts are of very appreciable cross section compared to the dielectric, it naturally follows that the distortion in the metal under working load can be materially reduced by using a large cross section in the metal. If the internal metallic member is made of a large solid piece, the longitudinal deformation will be very slight under working load. However, if this part is very large, the dielectric will of necessity have to deform in accordance with the changes in dimensions of the metallic member, thereby setting up a very material stress due to differential expansion or contraction caused by changes in temperature.

Where the contraction of the metal part is large, it will tend to transfer the load to the upper part of the pin hole at lower temperatures, or temperatures below the assembly temperatures. For higher temperatures the pin will expand longitudinally and the upper portion of the pin will press upwardly toward the closed end of the head of the dielectric, the load being thus transferred to the lower zone of the pin hole, thereby placing the dielectric cylinder in tension and shear. With a pin of large cross section, the expansion will also tend to set up radial stress tending to burst the dielectric member. While this may be overcome to some extent by the resilient joint described in my prior Patent No. 1,284,975, the relief thus provided may not be sufficient to overcome the distortion in the dielectric and metal parts and to provide relief for the thermal stress where the parts are built for heavy working loads.

Figures 7, 8:
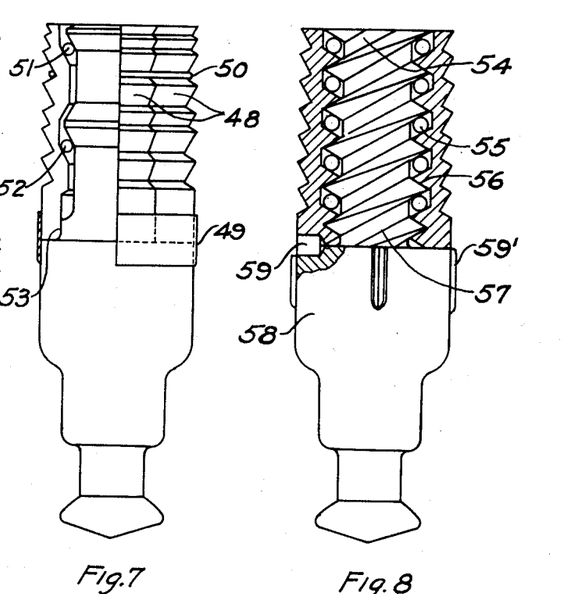
Figure 9:
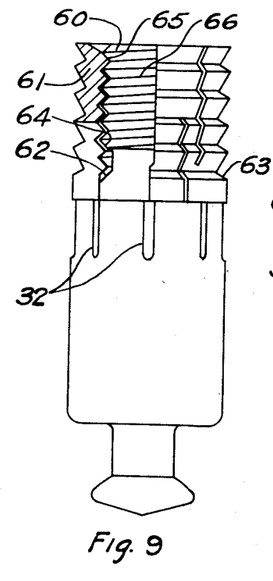
Figure 10:
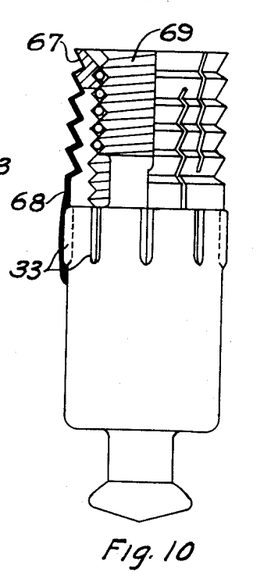

A sleeve 18, shown in Figs. 1 and 2, is cemented in the recess in the porcelain member 10 by Portland cement 19 or other suitable cementing agent, and is provided with slots 20. These slots may be formed in a variety of ways. In Fig. 1 they are cut down from the top of the sleeve to points near the bottom but they may alternately open at opposite ends and overlap but not intersect, as shown in Figs. 9 and 10. The distributing or resilient thimble may also be made up of entirely separate pieces, as shown in Fig. 7.

When tension is applied to the terminal members 13 and 15, stress will be transferred from the metallic parts to the dielectric 10. The general line of this stress is shown by line 21 but the direction of this resultant may change materially with the design, and for changes in load or for temperature. When the load increases, the metallic parts on the inside tend to press outwardly and the metallic parts on the outside must of necessity press inwardly. The stress tends to cause the metallic member on the inside to decrease in diameter and that on the outside to increase. There is also a tendency to deform the dielectric member by the pressure on the two sides. Since the dielectric member has a lower modulus of elasticity than the metallic parts, its deformation is considerably greater even though the cross section is larger than the metallic members.

In order to compensate for the distortion and maintain a tight contact between the thimble, cement and dielectric it is desirable that the load be applied so as to cause a movement in the resilient thimble 18 that will maintain contact. To secure this result, a bolt or pin having a head 22 is placed in a suitable socket 23 of the resilient thimble. The bearing surface between the thimble and the head of the bolt is at such an angle that the applied load will tend to draw the head of the bolt down and cause the resilient thimble to expand, maintaining the outward pressure of the thimble against the cement and compensating for the distortion of the cement, the dielectric and the metal parts. This angle will depend upon the angle of the resultant 21 and upon the coefficient of friction between the head of the bolt and the thimble 18.

Since the thimble is slotted or is of a resilient nature, it can expand as the bolt head is drawn down. By placing the bearing surface at the proper height with relation to the other parts, a very good distribution of stress can be obtained in the dielectric which will taper off gradually so as to avoid shearing stress in the dielectric, which would cause rupture and electrical failure. Since the bearing is near the top of the thimble 18, the latter will be subjected to a stress which will tend to place it in compression so that an increased load will not tend to stretch the thimble and place the lower part of the porcelain in heavy tension and shear.

In Fig. 1 the thimble has a small continuous annular section 24. This tends to hold the lower part of the thimble in its outward position when not loaded, but also tends to relieve the stress on the lower part under load as this portion is small and will contract under the load, thereby tending to throw the greatest pressure well up toward the top of the pin hole. Pressure on this portion of the thimble having the ring section 24 can be prevented by coating this portion with wax or other yielding material during the assembly operation.

If a load is applied to the insulator, it is evident that the head of the pin can slide down in the recess and owing to the stiffness of the sections of the thimble 18, this load may be distributed over a considerable portion at either side of the bearing area between the pin head and thimble. Since the bearing surface between the pin and the thimble is metal, a fairly definite coefficient of friction will be maintained. This coefficient of friction is important in the control of the thermal stress. If we assume that there is a given relation between the head 22 of the pin and the socket in the thimble, and owing to a rise in temperature the metal parts in the pin hole expand at a greater rate than the dielectric, it is seen that the radial pressure between parts will be increased. Owing to the slots in the resilient thimble this member will have little or no strength in a circumferential direction, particularly where the gaps are filled with resilient material or simply opened, the cement being prevented from going into these slots during assembly by the use of wax or other means. With the increase in pressure in a radial direction there will be a tendency to set up a longitudinal component which will cause the pin to lift, allowing the pieces making up the walls of the thimble to contract and relieve the thermal stress.

It is therefore seen that owing to the slotting and the inclined surface, means are provided for relief for an increase in pressure between the thimble and the cement or dielectric outside of same. It is evident that there must be some longitudinal movement in the pin for this relief. By allowing a very slight clearance at the junction point 25 or by the use of a small gasket or cushion at this point, any desired relief may be provided for. In many cases the working loads exceed the conditions under which the insulator is assembled to such a degree that there will be a slight clearance due to the stretch of the body portion 26 of the pin, so that although the members are assembled under working conditions, there will be sufficient clearance to provide relief for differential movement of the parts.

The thimble 18 may be made of a material having a low linear coefficient of expansion if desired, or the section and gripping surface may be made of any desired shape to control the stress between the surface of the thimble, and cement and dielectric.

Figure 11:
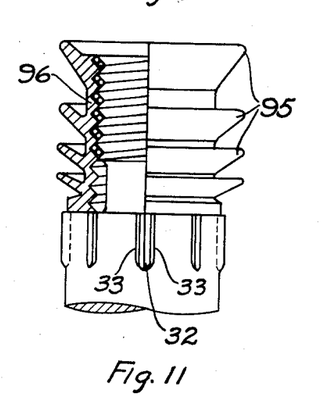

Since the compensation is determined by movement between the head of the pin and the inside surface of the thimble, it is not necessary that the thimble slip upon the cement, thereby making it possible to set up conditions which can be controlled very definitely. The radial stiffness at the lower end of the thimble may be controlled by slotting, as shown in Figs. 9, 10 and 11, or by controlling the cross section 24. Under load the upper portion will tend to be deflected outward, the various sectors acting as beams with one end fixed by the section 24. With this arrangement means are provided for controlling practically any gradation of stress between the bearing surface of the thimble and the cement and adjacent porcelain.

If desired, the head of the pin 22 may be made up of material having a low linear coefficient of expansion for changes in temperature, such as invar. With an invar pin and the proper thickness of the thimble portion 18 adjacent to the bearing surface, there will be little tendency for the whole mass to move, due to temperature changes, with respect to the porcelain. By using a combination of this kind the thimble can be compensated for changes in temperature, so that the only tendency to move at the compensating surfaces between the thimble and pin head will be that due to changes in load. This is a material advantage as it tends to reduce the importance of the coefficient of friction between the surfaces. If the coefficient of friction is high, there must be an appreciable component of the load force along the face of the bearing surface sufficient to overcome the friction before movement and compensation will take place and on reduction of load there must be an appreciable component in the opposite direction before the parts will slip and return to normal position. Owing to the coefficient of friction the parts will therefore not immediately adjust themselves to every change in temperature. This is not a serious objection where the compensation will take place without too big a change in load due either to the thermal stress or the working load. The use of metal parts having a coefficient of expansion substantially the same as that of porcelain, thus avoiding the differential expansion between the metal and dielectric, makes it unnecesary to compensate for this factor which is likely to be very appreciable for large metal parts.

The resilient thimble can be reinforced to avoid thermal stress by a cylinder or sleeve 27, shown in Fig. 4, which is in contact with the inner surface of the segments making up the resilient thimble 18. If this material is invar and of proper cross section, good contact will be maintained between the segments and the adjacent cement or dielectric over a wide range in temperature. Owing to the fact that this material is small in section, it can be readily deflected or distorted under load. With a drop in temperature the reduction in pressure between the thimble and the cement, due to the contraction of the segments making up the thimble, will be reduced by the invar sleeve 27. By the use of the compensating sleeve or ring 27, it is possible to hold the segments outwardly. This compensating sleeve 27 may be either short or long, or any desired form. Since it is in compression it need not be continuous circumferentially, but may be formed of a split ring for easy construction and assembly having the edges simply butted together.

Distortion in the cap and the dielectric in Fig. 1 is taken care of by the slipping of a thin metallic envelope or sleeve 28 engaging bearing surfaces 29 in the cap. The compensating ring 17 applied to the cap makes it possible to control the relation between cap and dielectric for differential expansion or contraction. The slipping between the sleeve 28 which is cemented to the dielectric member and the bearing surfaces in the cap will compensate for distortion in the metallic members constituting the cap, and in the dielectric with its attached cement and metal sleeve 23.

Since the bearing is considerably larger at the cap than at the pin and the stresses therefore distributed, it is not so important to control the stress at this point provided ample cross section of material is provided so that the distortion will not be too great under load and further provided that with the increased cross section of material, thermal stress will not be set up which will cause the destruction of the dielectric due to contraction or a failure mechanically due to expansion. The compound type of construction in which the differential expansion is controlled by the ring 17 made of material such as invar makes it possible to provide a wide working range.

The resilient thimble 18 with its bolt 26 and reaction head 22 can be made detachable by means of threads 30 so that the pin section 29 with its attaching ball 16 may be removed, or if desired the member 29 may be screwed up sufficiently hard against the lower end of sleeve 18 to set up a reaction and outward component in the sleeve in advance of applied load. In general, however, all that is necessary is to screw the two parts together, but if it is desired to place additional torsional stress upon the metal parts, the body of the bolt 26 may be locked to the member 29 by a suitable pin 31. The member 29 may be given longitudinal grooves 32 as shown in Fig. 9, or projections 33, as shown in Fig. 10, or combined grooves and projections as shown in Fig. 11. These grooved portions will lock into the cement or porcelain member and prevent rotation. This will remove any necessity for locking the bolt 26 and the lower section of the pin 29.

The pin 22 and thimble 18 may be locked against relative rotation by any suitable means, but this in general is not necessary unless the parts are irregular and rotation would cause a different bearing from that maintained during assembly. A projection or fin 34 placed on the body 26 will slide in a slot or groove of the resilient thimble and maintain the relation between the parts.

While the general relation described and shown in Fig. 1 is fairly simple, the construction has particular advantages which are not apparent as it affords means for avoiding slight unevennesses in the materials or conditions in the bearing areas which would destroy the mechanical relation which it is desired to set up. Where the load is concentrated either on the metal or dielectric, the distortion will be increased and the distribution of load will be different from that where the sections are larger. If a portion of the resilient thimble should not bear against the bolt, this portion of the thimble will not carry its portion of the load and the unsymmetrical distribution of stress may cause destruction of the dielectric. If means are not provided to eliminate this defect, the general arrangement and advantages of the construction are useless for very heavy loads and the efficiency of the combination is greatly reduced for any condition.

Particular attention has been given to the feature which makes it possible to insure a good contact between the surfaces which are designed to move and cause displacements to compensate for temperature changes or changes in load. With the construction shown in Fig. 1, this is obtained by placing longitudinal stress between the head of the pin 22 and the resilient thimble 18 so that contact will be established between the several sectors and the head. Making the thimble of appreciable mechanical strength and providing the resiliency makes it possible to draw the parts together until the various sectors are in contact, even though they may be warped due to the machining or galvanizing operations. This relation is particularly important during the hardening of the cement. After the hardening of the cement, it is not so important that the contact be maintained as the several sectors will have their proper relation with respect to the pin, so that all parts will come into contact and distribute the load when tension is applied to the insulator.

As previously explained, a resilient gasket or washer 25 may be placed between the thimble 18 and shoulder on the pin section 29. The bolt 26 may run directly through the resilient thimble and be formed integral with the portion 29, as shown in Figs 4 and 5. The pin itself may be made in any desired form. The portion 29 and the body 26 may be made in one piece with the head 22 riveted, as shown in Fig. 4, or screwed into position as shown in Fig. 5. This will make it possible to use a very small piece of compensating metal in the head 22.

In order to maintain a definite coefficient of friction or to control the coefficient of friction, washers or bearing plates 35 may be placed between the reaction head and the bearing surface on the thimble, as shown in Fig. 4. A single washer may be used or several made of different materials if desired so as to control the coefficient of friction. If these pieces are hard and smooth, the coefficient of friction may be materially reduced. If they are of rough or soft material, they may be used to limit the stress on any portion and tend also to increase the coefficient of friction slightly to prevent relative movement for slight changes. Where the construction is such that the segments may not be fitted tightly to the reaction head, it is desirable to use a gasket or washer which will deform and limit the pressure. Any suitable gasket which will flow such as lead or copper, or such as corrugated or dimpled gaskets which can be deformed under the load, can be used for the distribution of stress.

Fig. 5 shows a type of construction which practically eliminates the effect of the coefficient of friction between the head 22 and sleeve 18. In Fig. 5 the reaction between the bearing head 22 and the thimble segments 18 is transferred through a rolling member 36 shown and claimed in my prior application Serial Number 453,180, filed May 17, 1930. This rolling member may be of any suitable form such as a wire, small coiled spring, a series of balls or cylindrical sections, or beads. The roller may be in the form of a wire or rod having reduced or neck portions connecting larger portions or in which a thread is cut. This will tend to give the member flexibility for rotation and allow longitudinal contraction or expansion as the member rolls. The construction is such, however, that the movement is so slight that many forms of construction will give very satisfactory results. It is evident that where the member 35 rolls easily, changes in temperature or load will tend to set up a definite fixed relation between the head of the member 22 and the sleeve portions 18, thereby tending to maintain the same relations. The construction in this respect is truly resilient as a reduction in load will allow the parts to return to their normal condition, and a relative change due to radial contraction or expansion will be readily compensated for by the relation of the head 22 and the resilient thimble 18.

In the modification shown in Fig. 3, the resilient thimble has a multiple bearing surface in place of the single bearing or reaction surface between pin and thimble or the rolling member 36. The pin is provided with a thread 37 with the necessary reaction surface. The thimble is provided with an internal thread 38 and the load is transferred between the threads of the thimble and those on the pin by means of rolling members 39. It is readily seen that with this arrangement the load may be distributed over a considerable longitudinal portion of the resilient or sectionalized thimble. The radial component for different longitudinal sections of the thimble may be controlled by changing the pitch of the thread in the thimble with respect to that on the pin by changing the diameter of the member 39 or by changing the pitch diameter. This may also be controlled by the rigidity of the member 39 for different sections. The member 39 may consist of any device for reducing friction. This may be a round section in which grooves or threads are cut to reduce the stiffness and strength in the longitudinal direction. By regulating the amount of effective material in the bearing it is also possible to control the reaction between the body of the pin and the thimble at different points. This means of control is exceedingly important with large insulators where it is desired to distribute the load over an appreciable area. In order to change the effective radial clearance or bearing, the member 39 may be provided with little ridges or burrs of varying height. This will make it possible to insure a contact between the various sections 38 of the thimble, and the member 39, and the bearing surfaces 37 on the pin. Under load, however, the very small section of the ridges will limit the bearing until the load has set up a sufficient stretch in the pin. The ridges, however, will insure the proper relation of the thimble with respect to the pin body during the assembly operation.

By varying the strength either due to the cross section or the number of turns in a given length where a spiral spring is used, the load may be varied for different portions of the pin. The constructions have the very great advantage that means are provided for the distribution or control of stress over large areas without danger of using parts which will collapse due to a slight torsional component set up by the angularity of the parts or struts as in the case of a spring ring or a helical member in which the axis is rather large compared to the diameter of the material. In the present invention it is possible to use a helix of very small diameter so it will not collapse under any torsional moment, and owing to the fact that the stress does not come directly upon the helical or rolling member, small members which will not collapse do not necessarily mean a concentrated stress in the dielectric as this is distributed by the bearing plates. These bearing plates may be of any suitable grooved or rough shape which can be cemented to the dielectric or which can bear directly against the dielectric with great accuracy or with a cushion between.

The ability to provide a construction which will not permit the pulling apart due to the failure of the rolling or resilient member is of material advantage. The fact that a small member may be used and still obtain the necessary stress distribution is of very great importance. It is not necessary to use fillers such as lead or other material to prevent the collapse of the resilient or rolling member, thereby leaving this member free to adjust for temperature changes. Where resilient members of the helical type are used in direct contact with the cement or porcelain, the effective bearing area must of necessity be decidedly limited, as the effective contact area of the helical member is very small. This high concentrated stress tends to cause a failure of the crystalline or fragile structure of the dielectric.

Unless the resilient member is comparatively weak, unevenness in the construction will cause unequal loading. The thimble construction eliminates any tendency to unequal pressure as all bearing parts can be brought into proper contact and relation while the cement is setting, thus eliminating the effect of any unevenness or warping in the members.

The construction is such that it has very great advantages in case of a puncture of a part. Where a part is punctured by lightning, uneven stress, or high concentrated stress or other cause, the power discharge generates a very high temperature. Under this condition helical springs taking the bearings are very unreliable as their strength may be destroyed, due to the high temperature or annealing. In the present arrangement the construction is easily made so that the helical spring members or rolling members between the reaction surfaces on the pin and thimble can be removed and the mechanical integrity will not be destroyed. This is exceedingly important as defects of this kind may not show up until some time after they occur.

If dependence is placed upon lead or other soft metal to prevent the collapse of the helical bearing members, the heat will soften this material and permit a collapse under a very slight torsional stress or component, either due to unevenness in the helical members or due to applied load.

The general scheme of construction permits of a wide application to suspension and bus insulators, or for an anchorage where it is desired to control radial or longitudinal stress.

Figure 6:
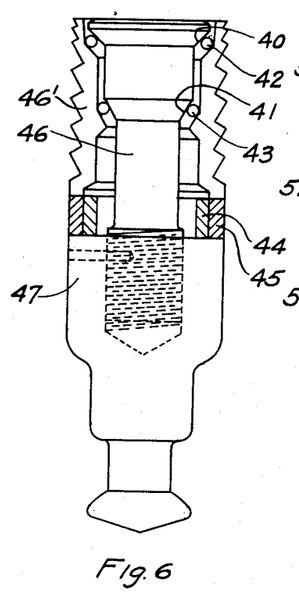
Figs. 6, 7, 8, 9, 10, 11 and 12 are elevations with parts in section showing various forms of insulator pins having the invention applied thereto.

Fig. 6 shows a different form of the construction in which two bearing zones are used between the pin body 46 and the thimble 46′. The pin has an upper reaction surface 40 and a lower one 41. The rolling members 42 and 43 may be of the same rigidity, or may be quite different depending upon the stress desired. The bearing face of the reaction shoulder 41 may have an entirely different angle from 40 to change the relative stress due to the stretch in the pin body or to change the distribution of stress transferred to the cement or dielectric at different points. A very appreciable control in the stress may be obtained by changing the mechanical characteristics of the two members 42 and 43. If these are made of helical springs, the number of turns in the unit length, the diameter of the helix and size of material as well as the material itself can all be used to control the rigidity of the members and the distribution of stress. This makes it possible to insure proper contact between the sections of the thimble, the bearing members 42 and 43, and the reaction surface on the pin.

By using a compound ring 44, 45 at the base of the thimble 46′, the relative movement between the thimble and cement or dielectric can be closely controlled. One method of securing the desired result is to insert a ring 44 of material having a low coefficient of expansion, inside of the continuous band 45. By assembling this at the proper temperature or under pressure the linear coefficient of expansion for changes in temperature in a radial direction can be controlled very closely. Since the upper part of the thimble is slotted and free to move, an increase in the pressure will simply result in the body of the pin being drawn upward.

By making the body section 46 of proper size, the pin and sleeve may be tightly assembled for cementing into the insulator. Under the working load, however, a slight clearance will be obtained between the lower edge of the thimble and shank of the pin 47. This will permit the adjustment for changes in temperature or radial movement of the thimble due to changes in load or due to thermal stresses.

The thimble may be made up of pieces which are entirely separated as shown in Fig. 7. These may be rolled sections, small castings or pieces of pressed material. The sectors 48 are held in position by a band 49 and a small wire or band 50, or other suitable means. The proper position of the sectors with respect to the anti-friction members 51 and 52 and the reaction surfaces or shoulder may be determined by assembling the bands 49 and 50 so that the parts are in contact.

Where a single bearing surface or anti-friction member 51 only is used, the lower end of the thimble segments may be held in position by their bearing upon the body of the pin at point 53. With this construction the thimble may be made up of two or more parts, and it is not necessary to thread the two parts of the pin together as they can be assembled directly about the pin.

The bearing surfaces are not necessarily confined to helical surfaces or surfaces of revolution, and the sectors of the thimble may be made with flat surfaces and the interior and exterior may be made up of any suitable form such as a hexagon or octagon. This class of construction permits the use of straight rollers for anti-friction members.

In the form shown in Fig. 8 the pin body 54 is provided with a helical thread which forms the reaction surfaces. A suitable anti-friction member 55, such as a helical spring made out of wire or a small helical spring or one in which the cross section or effective crushing strength is controlled, can be used to distribute the load. By making either the diametrical or longitudinal pitch different for the reaction surfaces of the pin body 54 and the resilient thimble 56, it is possible to control the distribution of stress due to longitudinal stretch of the body section 54. This control of the body stretch is exceedingly important, particularly where there is not much radial resiliency.

If all the bearing parts are in contact under a light load, the stress in the pin section at the point 57 is the maximum when a heavy load is applied, and practically zero at the upper end due to elongation of the pin under load. It will therefore be seen that as the load increases, the stretch in the pin will tend to place the reaction surfaces in contact with the anti-friction members 55, thereby transferring a heavy stress to the thimble. In order to compensate for this elongation, it is possible to limit the pressure produced by the stretch by regulating the mechanical strength or rigidity of the member 55. Where these members are of sufficient diameter this may be readily controlled by varying the stiffness of the parts in a transverse direction. If the anti-friction member 55 is in the form of a helical spring, distribution of stress may be readily brought about by using a spring section of several different strengths or by reducing the number of turns for a given length as the lower end 57 is approached.

By providing a difference in the diametrical pitch, there will be little or no bearing toward the lower end 57 until the load reaches a desired value. The same may be controlled by giving the thimble and the center portion two different longitudinal pitches. If the longitudinal pitch of the thimble is greater than that of the pin, it will be seen that bearing will occur at the upper end during light loads and it will not occur at the lower end until the pin stretches and brings the parts into bearing. Without control of this feature the device is limited in its application both from the efficient use of materials and the ability to obtain high working stresses without damaging the dielectric. This compensation applies to the type of construction shown in Fig. 9 or, in fact, any of the constructions in which more than one bearing surface is used and in which the diameters of the metal parts are such as to be worked at rather high stresses.

Balls or small cylindrical sections or beads, as well as a helical spring, may be used for the anti-friction members 55. An anti-friction roller may be made up by twisting a flat strip of metal giving a member somewhat similar to a twist drill. By regulating the thickness of this strip and the pitch of the helix thus formed, it is possible to obtain the desired strength of roller. By controlling the longitudinal pitch of the twisted member, it is possible to control the radial or diametrical strength and the bearing area between thimble and pin.

A lock may be provided between the thimble portion and the body portion 58 by a pin 59 or by grooves or ridges 59' for gripping the cement. A slight nick in the body section will produce a groove and raise a ridge on either side of the groove which will prevent the unscrewing of the parts after cementing.

In Fig. 9 the construction differs from the forms previously described in that anti-friction members are not used. Any convenient means may be used to grade the reaction between the body portion 60 and the bearing surfaces on the thimble 61. One method is to use a difference in the diametrical or longitudinal pitch of the meshing threads on the pin and thimble. Another way is to screw the thimble onto a tapered shoulder 62, or other suitable shoulder which will expand the lower part of the thimble 63 so that there will be some clearance between the reaction surfaces at the point 64 while there is contact at the upper portion 65. This insures a proper relation between the parts so that when load is applied and the body portion 66 of the pin stretches, the load will not be excessive at the lower part of the thimble. Without means to compensate for pin stretch, this class of construction is limited to rather short thimbles. With the control means, however, it is possible to provide a cheap and economical construction which will cover a wide range, be simple in construction and quite definite as to control of forces. The control of the stress may be made to depend entirely upon the fabrication of the metal parts or the limitation of the stress may be determined by their strength, particularly in the case where helical springs are used for anti-friction members.

With the arrangement described it is not necessary to depend upon coated surfaces where a slight difference in the thickness of the coating may result in a very unequal distribution of stress or failure in the dielectric after a period of time. The compensating construction may be applied to thimbles having resilient fins 95, as shown in Fig. 11. Where the resilient fins are used, these may be used to compensate for a longitudinal body stretch in the pin and the reaction surfaces can compensate for the radial distortion in the various members.

With the thimble having resilient fins and a thin body or wall 96, it is not necessary that the member be slotted, as the elastic stretch of the material will compensate for the radial component, and the variation in resiliency of the fins will compensate for longitudinal component. Where the fins or bearing surfaces have a relatively large deflection for the load, it is possible to coat these members with wax, asphalt or any yielding compound without danger of setting up a serious stress. Even if the thimbles are coated with a yielding compound or wax, compensated construction on the inside will produce a considerable equalization tending to compensate for the difference in thickness of the coating. The radial force or component cannot be set up on one side without a reaction on the opposite side. Therefore, if the coating of a thimble portion is heavy at a point on one side and thin at a point diametrically opposite, the body portion of the pin inside would move with respect to the thimble so as to equalize the bearing. The equalization is much better where the antifriction member is resilient or in which the number of reaction surfaces are few.

Pin body stretch may be compensated for by coating the thimble on the outside, as indicated at 68, in Fig. 10. The coating is very thin at the upper end 67 and thick at the lower end 68. This will permit a greater radial movement at the lower end and increase the clearance between the bearing surface of the pin 69 and the anti-friction members or reaction shoulders on the thimble. This coating may be applied to any of the various types of construction. The thickness of the coating may be regulated in any convenient way such as regulating the time of dipping in a wax bath or in the application of several coats at one zone compared to another, or if desired the thimble may be placed in a die having the proper regulation of space. The space is then filled with wax or other suitable material and allowed to harden, after which it is removed. This operation would also serve to fill in open spaces so as to prevent the entry of cement during the assembly operation. The construction, however, is such that there need be no slipping between the thimble and cement. Even where the coating of the surface permits a certain amount of slipping, the compensation is not dependent on slipping between the cement and the thimble, but rather upon the bearing surface inside. Where the sections of the thimble are very large and rigid, there might be some slipping required between the cement and the thimble for a wide range in the load or thermal stress.

Figure 12:
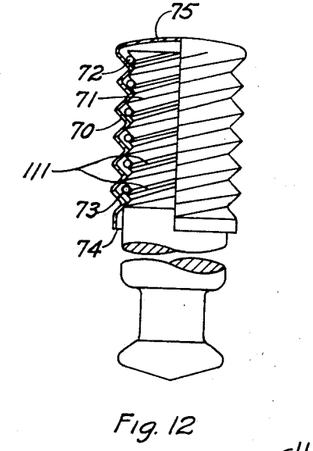

While the construction is particularly applicable to heavy sections in contact with the cement, it is possible to use the general principles where the sections in the thimble are so thin as to offer little force in a radial direction, and where dependence upon the distribution of stress in a longitudinal direction can be obtained by anti-friction means by the control of the relative pitch between the thimble and internal member. Fig. 12 shows a construction of this type.

The thin shell 70 may be provided with an internal threaded surface or, if made up in two or more parts, may be simply clamped around a pin having annular reaction shoulders. In some cases it is possible to spin or compress the thimble over the pin having the reaction shoulders. The construction differs from previous constructions using a thimble and a pin in that the radial component is determined by slipping between parts and the longitudinal component due to a difference in the diametrical or longitudinal pitch or in the strength of an interposed anti-friction member.

In Fig. 12 the pin 71 inside the thimble 70 is provided with a thread having reaction shoulders of the proper angle. This may be a single thread or a multiple thread as desired. Fairly close contact is obtained at 72 at the upper end of the pin and rather loose contact at 73, the closeness of the contact being gradually graded between these points. If it is desired to have the same contact between the body portion of the pin at all points for the sake of manufacture, the thimble may be coated, having a fairly heavy coating at the open end 74 compared to the closed end 75 as previously explained. Since the thimble has a small section mechanically, it will readily stretch and relieve the load. The thimble will provide a slipping surface, however, between the body of the pin and the thimble so that the cement will not be destroyed due to compensation for differential expansion or changes in load. By the use of resilient members the friction between the thimble and the body portion may be materially reduced.

The characteristics for loading may be greatly changed by control of the forces set up by the stretch of the body 71. Where the thimbles are uniform it is possible to change materially the stress distribution in the insulator by change in the relative bearing between the pin section 71 and the thimble 74 by any of the previously explained methods. If the insulator is to be used on a very heavy load, the variation in diametrical or longitudinal pitch is materially increased so that the increased pin stretch will be compensated for. By this means the general characteristics may be readily changed, and by providing compensating means it is possible to work the metal portions at a much higher stress than otherwise without setting up dangerous components in the insulator. Compensation for pin stretch is an exceedingly important point as a stress of 20,000 pounds per square inch in the metal will produce a stretch which may readily cause failure in the adjacent dielectric. It is therefore seen that unless some means is provided for compensating for the elastic stretch of the metal, the latter must be worked at a rather low value compared to its ultimate. The ultimates on metals used for insulators usually run from 60,000 pounds to 80,000 pounds per square inch, and the modulus of elasticity is generally between 20,000,000 and 30,000,000. The modulus of elasticity of the dielectrics is approximately 3,000,000 and the ultimate in tension approximately 3,000 pounds per square inch. It would therefore follow that a stretch of one thousandth of an inch in one inch would produce an ultimate in the dielectric. For a metal having a modulus of elasticity of 20,000,000, the stress of 20,000 pounds per square inch will produce a stretch of one thousandth of an inch in one inch, which would be sufficient to reach the ultimate of the dielectric.

Figure 13:
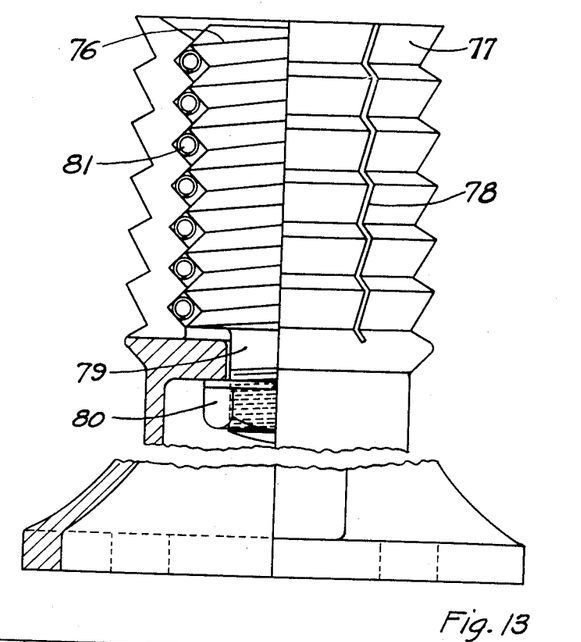
Figs. 13 and 14 are elevations with parts in section showing pins for bus insulators having the invention applied thereto.

In the form of the invention shown in Fig. 13, the improved construction is applied to a pin similar to that used in a bus insulator. Provision must be made in this form of construction for bending moments and torsional stresses of considerable magnitude. In order to set up the desired reactions and insure tightness, the body 150 member 76 is placed inside of a suitable recess in the pin or thimble portion 77. This thimble portion is provided with slots 78 which will permit resiliency in a radial direction. The member 76 is provided with a threaded stud 79 and a nut 80. The nut 80 may be tightened to force the reaction surfaces against the anti-friction members 81 which in turn bear against the suitable surfaces provided in the thimble. By making the section 76 of material having a proper linear coefficient of expansion for changes in temperature, it is possible to control radial stress to a very large extent, which is important where the members are large as in big bus or post insulators used on high voltage buses or disconnecting switches. A graded stress may be provided by varying the rigidity of the anti-friction member 81 for different sections. Where the loads are to be high, the tightening of the nut 80 after assembly will tend to set up an initial force which will materially add to the ultimate which may be obtained. With this construction the mechanical strength of the walls of the thimble are utilized to maintain the heavy bending moments.

Figure 14:
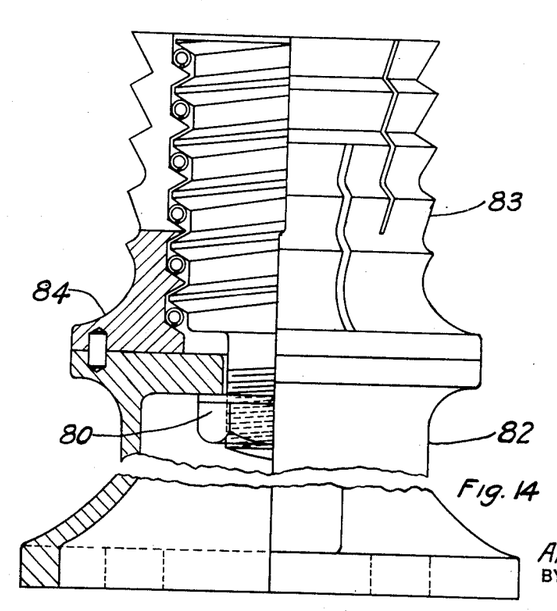

In Fig. 14 a somewhat different construction is shown in which the pin is made up of a body section 82 and a thimble section 83. This arrangement is more suitable for tension than for bending moments although a bending moment will tend to set up the necessary radial reactions to develop the pull in the longitudinal direction between the thimble and cement or dielectric. The bending moments will tend to draw the thimble downward and increase the pull on the same. This construction is particularly applicable where the thimble and pin may be provided with large shoulders 84, which will increase the moment for a given tension on the bolt holding the thimble and body together. When used for post insulators, locking means are generally provided to prevent relative rotation between the pin and thimble.

By tightening the nut 80 and thus setting up an initial stress, it is possible for the pin to withstand a transverse load on the top of the pin up to a point determined by the initial stress before the shoulders 84 will tend to part on the tension side under the bending moment. This construction is particularly applicable where it is desired to provide the insulator with different pin body sections.

If desired the thimble section may be without the slots providing resiliency where the thimble section is sufficiently thin, the tightening of the bolt setting up a radial component. The tightening of the bolt which changes the relation of the pin and thimble is equivalent to changing the temperature of assembly where there is a material difference in the linear coefficient of expansion for changes in temperature between the metal and dielectric. This makes it possible to assemble at a comparatively low temperature setting up a good structure in the cement, but at the same time obtaining the benefits of the higher assembly temperature by either relieving the pressure on the bolt after assembly or by tightening as desired.

Figure 15:
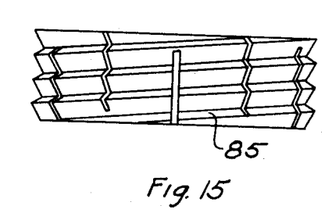
Fig. 15 is an elevation showing an insert for the cap in Fig. 3.

In Fig. 3 a resilient collar 85 having reaction surfaces in contact with a cap is used to control the distortion and stress set up between cap and dielectric or cement. Between this member and the cap is provided reaction surfaces of such an angle that slipping may take place to compensate for distortion. Where longitudinal clearance is provided a contraction of the cap at low temperatures will permit the rise of this member. The member 85 may be made up in sections where the grooves are closed circles, or it may be threaded into the cap if desired. The construction of this part is more clearly shown in Fig. 15. Anti-friction members can be used between the resilient collar 85 and the bearing surface on the cap. If this member is thin, the parts may be spun or sprung into position. Difference in temperature of the two parts is of material benefit in carrying out this operation.

Where anti-friction means are used between the collar and the cap, the insulator is compensated for temperature changes. The ability for parts to slide or roll on the angle will compensate for variation in loads. Where a compound cap is used such that the expansion rate is practically that of the dielectric, the only tendency to produce movement will be that due to changes in load.

The constructions are such that metal bearing surfaces are provided for compensation so that the coefficient of friction can be reduced to a minimum or at least maintained on the same basis over a long period of time. The necessity for metal parts to slip over the cement is eliminated, which might readily destroy the cement in time. The construction is such that large, heavy body sections may be used without the danger of setting up high stresses due to differential expansion or contraction, which has been the source of much damage to insulators in the past. The improved construction not only permits of the more efficient use of the metal, but makes it possible to use heavy inefficiently loaded sections without the danger of the high thermal stresses.

Figure 16:
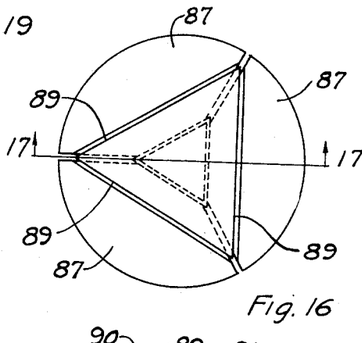
Fig. 16 is a plan view of a modified form of pin.
Figure 17:
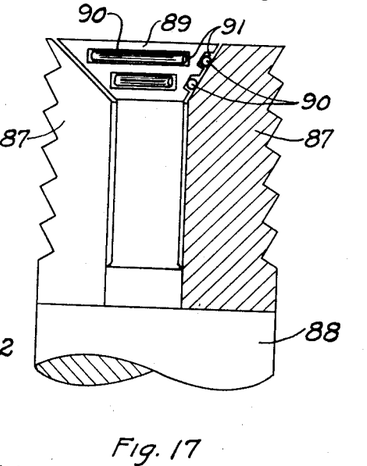
Fig. 17 is a section on line 17—17 of Fig. 16.

Figs. 16 and 17 show a type of construction in which the thimble is composed of separate segments 87. The body portion of the pin 88 has flat reaction faces 89. The segments 88 are arranged for bearing directly on these surfaces, or through the medium of anti-friction members 90. It is readily seen that this type of construction prevents rotation between the sectors and the pin body. The pin may be provided with any desired number of reaction faces and with any number of sectors using a plain surface for contact. For the reaction surface it is possible to use straight anti-friction members. These may be held by any suitable means or placed in grooves 91 which will permit sufficient longitudinal play but which will prevent the members being displaced.

Figure 18:
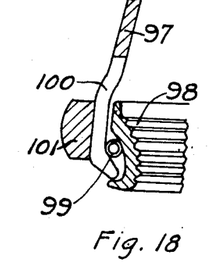
Figs. 18 and 19 are fragmentary sections showing modified cap arrangements.

In Fig. 18 the cap 97 is provided with a ring 98 to be cemented to the porcelain, there being a resilient roller 99 interposed between the cap and ring which provides a rocking bearing for the ring 98 and also permits a rolling movement to compensate for variation in the diameter of the parts, due to temperature changes or variation in the loading. The lower end of the cap 97 is provided with slots 100 which permits the cap to be spread sufficiently to receive the ring 98. After the ring is in place, the cap is compressed by a reinforcing band 101 which is pressed into place to force the edge of the cap against the roller 99. The band 101 may be of invar having a low coefficient of expansion so as to overcome differential expansion and contraction due to temperature changes.

Figure 19:
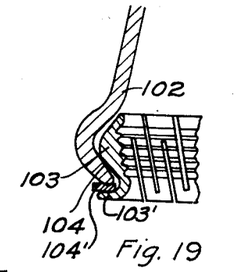

In the form of the invention shown in Fig. 19 the cap 102 is supplied with a resilient ring 103 shaped to provide a rocking bearing at 104 on the cap. The ring 103 may be pressed into place or may be assembled while the ring and cap are at different temperatures. The sleeve 150

103 is provided with a flange 103', and a spacer 104' may be placed between the lower edge of the cap 102 and flange while the insulator is being assembled to hold the sleeve and cap in close contact at 104. When the dielectric member has been cemented in place, the spacer 104' may be removed to give clearance for the cap and sleeve to slide to compensate for differential expansion and contraction due to temperature changes or changes in load.

Figures 20, 21:
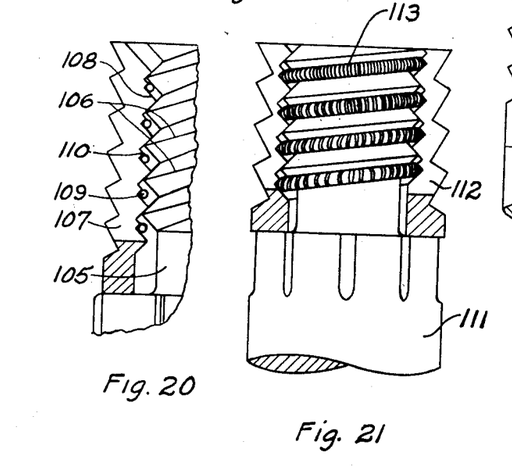
Fig. 20 is a fragmentary section showing a further modification.
Fig. 21 is an elevation of an insulator pin showing another modification of the invention.

In the modification shown in Fig. 20 the pin 105 is provided with a bearing thread 106 which fits into a resilient sleeve 107. The sleeve 107 is provided with an internal thread 108 which differs slightly in pitch from the thread 106 so that when the parts are free from the load, the bearing surfaces at the top end of the pin will be in contact while the bearing surfaces at the lower end of the pin will have loose contact; the tightness of contact gradually varying from top to bottom. This arrangement is shown in an exaggerated form in the drawing. Roller members 109 may be provided between the contacting surfaces to assure uniform movement of the parts under variations in loading and temperature conditions. In order to hold the rollers in position for rolling movement, shoulders 110 may be provided on the bearing surfaces of the cooperating threads. These shoulders may be in the outer thread 108 or may be on the inner thread, as shown at 111 in Fig. 12, which figure also shows a variation in the pitch in the outer and inner threads to compensate for pin stretch under load. It will be seen that, in either case, as the loading increases and the pin elongates, the parts will be brought into uniform bearing contact throughout the length of the thread, thus giving uniform distribution of stress under maximum load.

In the form of the invention shown in Fig. 21, the pin 111 is provided with a stress distributing sleeve 112 somewhat similar to that shown in Fig. 20, but in this case the compensation for elongation under the force of the load is secured by means of the resilient roller 113. This roller is in the form of a coil spring, the coils being close together at the top of the pin, and gradually spaced further apart at the lower end of the pin. This gives greater resiliency at the lower end of the pin so that as the pin stretches, the load will not all be concentrated at the lower end of the pin but the yielding of the roller will permit portions of the load to be carried by the bearings further up along the pin. The gradual variation at the spacing of the convolutions in the spring provides substantially uniform distribution of the load throughout the length of the pin. Instead of securing this result by means of varying the spacing of the convolutions, the same result may be obtained by changing the size of the wire of which the spring is formed.

Figures 22, 23, 24, 27:
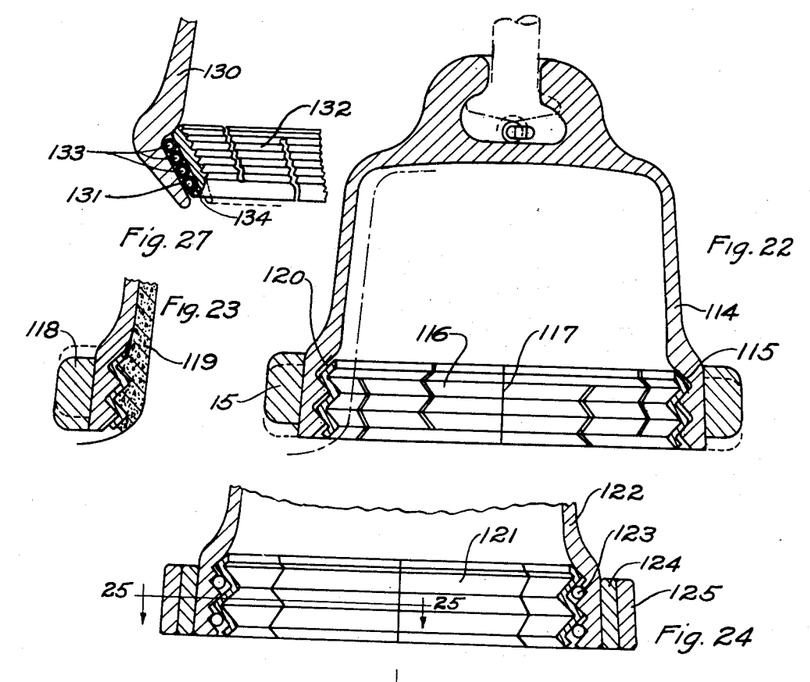
Fig. 22 is a vertical section of an insulator cap having one form of the invention applied thereto.
Fig. 23 is a fragmentary section of the cap shown in Fig. 22 but showing the position of the parts during assembly.
Fig. 24 is a fragmentary section of an insulator cap showing a slightly modified form of the invention applied thereto.
Fig. 27 is a view similar to Fig. 3 showing another modification.

In Fig. 24 the cap 114 is provided with continuous circumferential grooves 115 which receive a stress distributing sleeve 116. The sleeve 116 is formed to fit the grooves in the cap 115 and is split at 117. In assembling the device, the ends of the sleeve at 117 may be sprung to pass one another so that the sleeve may be placed in position, and when it is in position, the ends may be snapped into registration so that the sleeve will be held in the grooves in the lower edge of the cap. A reinforcing band 118 surrounds the lower edge of the cap and this band may be made of invar where it is desired to compensate for expansion and contraction due to temperature changes. The band will be pressed down into the position shown in Fig. 23 during assembly of the dielectric member which is secured in place by cement 119. After the insulator is assembled, the band 118 may be raised to the position shown in full lines in Fig. 22, permitting slight expansion of the cap which will leave sufficient clearance at 120 for expansion of the dielectric member, due to load, or for contraction of the cap at low temperatures. In Fig. 24 the stress distributing band 121 is made up of several sections which are assembled in place within the cap 122, and are held in place by the abutment of the ends of the various sections. Resilient rollers 123 may be inserted between the stress distributing sleeve and the cap where desired. In the illustration shown in this figure, two reinforcing bands 124 and 125 are employed. After the parts have been assembled, the band 125 may be removed to give the necessary clearance for movement of the sleeve and cap.

Figures 25, 26, 28:
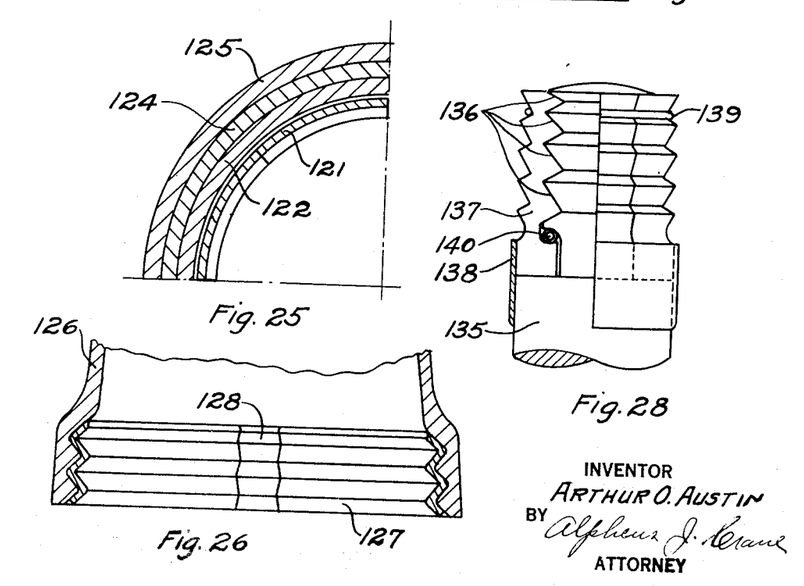
Fig. 25 is a section on line 25—25 of Fig. 24.
Fig. 26 is a view similar to Fig. 24 showing a slight modification of the invention.
Fig. 28 is an elevation of a portion of a pin showing a different arrangement of the invention.

In Fig. 26 the cap 126 is provided with a stress distributing sleeve 127 which has a removable key section 128. This permits the two ends of the band to be sprung together while it is being inserted into the cap, and when it is in place the key section may be moved between the spaced ends so as to lock the sleeve in position in the cap.

In the modification shown in Fig. 27, the cap 130 is provided with an inwardly inclined bearing surface 131 at its lower edge which supports a bearing sleeve 132. The sleeve 132 is slotted to provide resiliency, and spring rollers 133 are interposed between the surface 131 and the sleeve 132. The lower edge of the sleeve 132 is provided with an easy bent portion 134 which has the portion shown in broken lines when the parts are assembled. The rollers 133 are then forced into place in the recess between the surface 131 and the sleeve 132, and the portion 134 is then bent as shown in full lines in the drawings to retain the rollers in place.

In the construction shown in Fig. 28, the pin 135 has inclined bearing faces 136 which are graded in angularity so as to permit easier slipping at the lower end than at the upper end of the pin, thus compensating for pin stretch under load. The stress distributor 137 is formed of sections held together by bands 138 and 139 while the pin is being assembled in the insulator, in the manner described in connection with Fig. 7. A coil spring 140 is inserted between shoulders on the pin 135 and the distributor 137 to assist in restoring the relative position of the pin and stress distributor when the load is reduced after the parts have slipped on the surfaces 136 or when the pin expands relative to the stress distributor.

I claim:

1. An insulator comprising a dielectric member and a metal fitting connected therewith, said member and fitting having coacting bearing points fixed thereto respectively and distributed in the direction of the load on said insulator, the spacing of the bearing points on said member relative to the co-acting points on said fitting being graded according to their distribution in the direction of the load on said insulator so as to come into full bearing successively when said insulator is subjected to a load to compensate for distortion of said parts due to stretching thereof under load.

2. An insulator comprising a dielectric member, a pin secured in a recess in said dielectric member, said pin and dielectric member having a plurality of coacting bearing points fixed thereto respectively and distributed along said pin in the direction of the load on said insulator, said coacting bearing points on said pin and member respectively being graded in the closeness thereof to each other at no load for different positions of said points along said pin to equalize the distribution of force transmitted by said respective points when said pin is elongated by the force of the load thereon.

3. An insulator comprising a dielectric member, a pin secured in a recess in said dielectric member, said pin and dielectric member having a plurality of coacting bearing points fixed thereto respectively and distributed along said pin in the direction of the load on said insulator, the closeness of the fit of said coacting points being graded under no load from the inner end of said recess toward the outer end thereof, the fit being closest at the inner end and loosest at the outer end to equalize the force transmitted by said bearing points when said pin stretches under load.

4. An insulator comprising a dielectric member, a cap encircling a portion of said dielectric member and a metal sleeve fixed to said dielectric member and having wedging bearing surfaces thereon engaging cooperating bearing surfaces on the inner face of said cap, said bearing surfaces being disposed throughout their contacting portions at an angle to the direction of the load on said insulator steeper than the critical angle of friction between said surfaces and being relatively movable on each other under the force of the load on said insulator to compensate for variations in the diameter of said dielectric member and cap due to temperature changes or variations in the load on said insulator.

5. An insulator comprising a dielectric member having a recess therein, a metal thimble secured in said recess, a pin extending into said thimble and having bearing connections with said thimble distributed longitudinally of said pin, the initial bearing pressure at no load, between respective bearing connections, being decreasingly graded from the innermost connection outwardly so that the proportion of the load transmitted by said respective bearings progressively shifts outwardly along said pin as said pin elongates under load for equalizing the distribution of force transmitted between said bearings when load is carried by said pin.

6. An insulator comprising a dielectric member having a recess therein, a circumferentially yielding thimble cemented in said recess, a pin extending into said thimble, said pin and thimble having cooperating, wedging, bearing faces distributed along said pin in the direction of the length thereof for transmitting the load on said insulator, and means for holding the outer end of said thimble through which said pin extends expanded to permit the inner bearing faces to assume a portion of the load on said pin ahead of the outer bearing faces as the load is placed on said pin.

7. An insulator comprising a dielectric member, a radially yielding thimble secured in a recess in said dielectric member, and a pin threaded into said thimble, said pin having a shoulder thereon adapted to spread the outer end of said thimble when said pin is threaded into said thimble to grade the bearing of the pin and thimble respectively on each other.

8. An insulator comprising a dielectric member, an internally threaded thimble secured in a recess in said dielectric member, a pin, the portion of the thimble in threaded engagement with said pin being readily yieldable under the wedging action of the threads on said pin when said pin is subjected to load so as to transmit the radial component of the load to said dielectric member.

9. An insulator comprising a dielectric member, a metal fitting surrounding a portion of said dielectric member, and a stress transmitting sleeve fixed to said dielectric member and having wedging, sliding engagement with said fitting to compensate for variations in the relative size of said dielectric member and fitting the entire engaging surfaces of said sleeve and fitting being disposed at an angle to the direction of the load on said insulator steeper than the critical angle of slip between said surfaces under said load.

10. An insulator comprising a dielectric member, a fitting surrounding a portion of said dielectric member, a stress transmitting sleeve fixed to said dielectric member and having wedging sliding engagement with said fitting, and means for holding said sleeve and fitting in close contact, said means being adjustable to permit regulation of the contact between said sleeve and fitting.

11. An insulator comprising a dielectric member, a fitting surrounding a portion of said dielectric member, a stress transmitting sleeve interposed between said dielectric member and fitting, said sleeve being fixed to said dielectric member and having movable, wedging connection with said fitting to compensate for relative variations in the size of said dielectric member and fitting, said sleeve having clearance to permit sliding movement thereof in said fitting under working conditions of said insulator, and means for holding said sleeve and fitting tightly together during assembly of said dielectric member in said fitting, said means being adjustable to permit separation of said sleeve and fitting after assembly.

12. An insulator comprising a dielectric member, a fitting surrounding a portion of said dielectric member, a stress transmitting sleeve disposed in said fitting and secured to said dielectric member and having movable, wedging connection with said fitting along contacting surfaces disposed at an angle to the direction of load on said insulator less than the critical angle of slip between said surfaces, and anti-friction means interposed between said sleeve and fitting.

13. A fitting for an insulator comprising metal parts having interfitting bearing surfaces spaced in the direction of the load on the insulator, the bearing surfaces of said parts differing from each other in longitudinal pitch to compensate for stretch of one of the parts under load.

14. A fitting for an insulator comprising coaxial metal parts having spaced, cooperating bearing surfaces axially distributed along said parts, said bearing surfaces being inclined to the axis of said parts, the bearing surfaces on one of said parts having a graded difference in diameter therefor from the diameter therefor of the bearing surface of the other part to compensate for stretch of one of the parts under load.

15. An insulator fitting having a plurality of wedging bearing surfaces distributed over a zone extending longitudinally of the axis of said fitting, a thimble having wedging bearing surfaces opposed to the wedging bearing surfaces on said fitting and having the surface thereof opposite said fitting adapted to be secured to a dielectric member, and yielding roller bearings interposed between said bearing surfaces and having clearance to permit said bearings to roll on said surfaces, said roller bearings differing from one another in resiliency for different positions along said pin to control the grading of the stress transmitted from said pin to said dielectric member through said thimble.

16. An insulator comprising a dielectric member and a fitting therefor, said dielectric member and fitting having cooperating bearing surfaces fixed thereto respectively and a helical spring roller interposed between said surfaces, the spacing of the convolutions of said roller being graded to control the distribution of stress transmitted by said roller.

17. An insulator pin having a plurality of wedging bearing surfaces distributed over a zone extending longitudinally of said pin, a thimble surrounding said zone and having wedging bearing surfaces opposed to the bearing surfaces on said pin, the outer surface of said thimble being adapted to be secured within a recess in the dielectric member and helical spring rollers interposed between the bearing surfaces of said pin and thimble, the spacing of the convolutions of said rollers being varied to grade the distribution of stress transmitted from said pin to said dielectric member through said thimble.

18. A fitting for an insulator comprising relatively movable parts having cooperating wedging bearing surfaces for compensating for relative distortion of the parts, and resilient means acting on said parts independently of said bearing surfaces to restore the parts after relative movement thereof.

19. An insulator comprising a dielectric member and a metal fitting member, one of said members having a wedging surface for transmitting the load to the other, and resilient means acting on said members independently of said wedging surfaces and tending to hold said members in a predetermined position relative to each other and to restore said members to said position after relative movement thereof.

20. An insulator comprising a dielectric and a metal member secured together, one of said members being disposed within a recess in the other and one of said members being provided with a wedging face for transmitting the load on said insulator, and resilient means acting on said members independently of said wedging faces for restoring said members after relative movement thereof under the force of the load on the insulator.

21. An insulator having conical bearing surfaces disposed one within the other and drawn together by the load on the insulator, and a spring acting on said insulator independently of said surfaces and tending to move said surfaces relative to one another in a direction opposite to the direction of movement produced by the load.

22. An insulator comprising a dielectric and a metal member having cooperating, rigid, wedging faces for transmitting the load from one to the other, said faces being unbonded to each other and disposed at an angle to the direction of the load on said insulator steeper than the critical angle at which said faces will slide on each other under a force in the direction of said load, and resilient means for restoring said members after relative movement of said faces.

23. An insulator comprising dielectric and metal parts, said parts having rigid, wedging, bearing surfaces to compensate for unequal distortion thereof, and resilient means for restoring said parts after removal of the cause for unequal distortion.

24. An insulator comprising dielectric and metal parts having rigid, wedging, bearing surfaces to compensate for relative distortion of said parts for unequal expansion and contraction thereof due to load or temperature changes, and resilient means for restoring said parts after the cause of unequal expansion or contraction has been removed.

ARTHUR O. AUSTIN.